United States Patent
Hao et al.

(10) Patent No.: US 10,437,565 B2
(45) Date of Patent: Oct. 8, 2019

(54) DYNAMIC CODE SUGGESTION

(71) Applicant: International Business Machines Corporation, Armonk, NY (US)

(72) Inventors: Bi Bo Hao, Beijing (CN); Gang Hu, Beijing (CN); Jing Li, Beijing (CN); Wen Sun, Beijing (CN); Guo Tong Xie, Xi Er Qi (CN); Yi Qin Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/252,960

(22) Filed: Aug. 31, 2016

(65) Prior Publication Data

US 2018/0060044 A1 Mar. 1, 2018

(51) Int. Cl.
*G06F 8/33* (2018.01)

(52) U.S. Cl.
CPC .................... *G06F 8/33* (2013.01)

(58) Field of Classification Search
CPC ..... G06F 8/30; G06F 8/33; G06F 8/36; G06F 11/3612
USPC ......................................... 717/111
See application file for complete search history.

(56) References Cited

U.S. PATENT DOCUMENTS

| | | | |
|---|---|---|---|
| 6,314,559 B1 * | 11/2001 | Sollich ...................... | G06F 8/33 717/111 |
| 6,557,010 B1 * | 4/2003 | Kim .................. | G06F 17/30271 |
| 8,245,186 B2 | 8/2012 | Gryko et al. | |
| 8,271,939 B1 * | 9/2012 | Krishnaiyer ............... | G06F 8/33 707/795 |
| 8,510,794 B1 * | 8/2013 | Kaushik .................. | G06F 21/45 726/1 |
| 9,116,982 B1 * | 8/2015 | Stern .................. | G06F 17/30707 |
| 2005/0123202 A1 * | 6/2005 | Hwang .............. | G06K 9/00275 382/224 |
| 2007/0265814 A1 * | 11/2007 | Moore ...................... | G06F 8/10 703/10 |
| 2007/0288254 A1 * | 12/2007 | Eisner ................ | G06Q 10/0637 358/1.11 |
| 2009/0297044 A1 * | 12/2009 | Kokumai ................. | G06K 9/40 382/219 |
| 2010/0269095 A1 * | 10/2010 | King ........................ | G06F 8/43 717/111 |
| 2011/0246561 A1 * | 10/2011 | Eshima ............. | G06F 17/30867 709/203 |
| 2012/0174061 A1 * | 7/2012 | McCollum ................ | G06F 8/33 717/106 |

(Continued)

*Primary Examiner* — Jason D. Mitchell
(74) *Attorney, Agent, or Firm* — Cantor Colburn LLP; Grant Johnson (57) ABSTRACT

This disclosure provides a computer-implemented method for code suggestion. The method comprises collecting a set of runtime context features of a program that is being edited. The method further comprises comparing the set of runtime context features with at least one set of stored context features to find at least one matching set of stored context features. Each of the at least one set of stored context features is extracted from a corresponding code segment. The method further comprises presenting at least one code segment with its set of stored context features matching the set of runtime context features, for the user to choose to add into the program.

17 Claims, 5 Drawing Sheets

(56) References Cited

U.S. PATENT DOCUMENTS

| | | | |
|---|---|---|---|
| 2013/0007700 A1* | 1/2013 | Villar | G06F 8/33 |
| | | | 717/109 |
| 2014/0013299 A1 | 1/2014 | Bordeaux et al. | |
| 2014/0109042 A1* | 4/2014 | Christensen | G06F 8/34 |
| | | | 717/109 |
| 2014/0173563 A1* | 6/2014 | Dias | G06F 8/36 |
| | | | 717/123 |
| 2014/0282375 A1 | 9/2014 | Gulwani et al. | |
| 2015/0378692 A1 | 12/2015 | Dang et al. | |
| 2017/0006135 A1* | 1/2017 | Siebel | H04L 67/02 |

* cited by examiner

FIG. 1

(PRIOR ART)

DYNAMIC CODE SUGGESTION

BACKGROUND

The present invention relates to the field of computer programming, and more specifically, to a computer-implemented method, a system and a computer program product for code suggestion.

Today, many Integrated Development Environments (IDEs) have been developed to facilitate programming work of programmers, such as Visual Studio®, Eclipse®, JetBrains®, Jupyter Notebook® and etc. In many of these IDEs, a function referred to as code suggestion is provided to accelerate the input of codes. If a programmer types, in an editor of an IDE for Java language, a line of code "System.out.printl", which has an incomplete name of method, a menu will pop up near the cursor in the editor, which shows names of methods starting with "printl", such as "println( )", "println(boolean x)", "println(char x)", "println(float x)" and etc. The programmer may choose one option from the menu to complement the incomplete name of method. For example, if the name of method "println(float x)" on the menu is chosen by the programmer, the code being edited will be automatically complemented as "System.out.println (float x)".

In another example, if an incomplete variable "ttest_" is input by a programmer in an editor of an IDE, a menu will pop up near the cursor in the editor, which shows variable names starting with "ttest_", such as "ttest_lsamp", "ttest_ind", "ttest_ind_from_stats" and etc. The programmer may choose one option from the menu to complement the incomplete variable. For example, if the variable name "ttest_ind" on the menu is chosen by the programmer, the incomplete variable will be automatically complemented as "ttest_ind" in full.

Additionally, the current IDEs can also provide code suggestion for keywords of a programming language. For example, in an editor for C language, if "siz" is input by a programmer, a code suggestion of "sizeof" will be presented to the programmer, which is a keyword of C language in its complete form. All of the above techniques are referred to as code suggestion, which help programmers to remind names of variables and methods, and keywords of programming languages and to input codes fast.

SUMMARY

The inventors of the present invention found that there is a need for dynamic code suggestion on the basis of runtime context features.

To address the need, it is proposed a computer-implemented method, a system and a computer program product for code suggestion.

According to one aspect of the present invention, there is provided a computer-implemented method for code suggestion. The method comprises collecting a set of runtime context features of a program that is being edited. The method further comprises comparing the set of runtime context features with at least one set of stored context features to find at least one matching set of stored context features. Each of the at least one set of stored context features is extracted from a corresponding code segment. The method further comprises presenting at least one code segment with its set of stored context features matching the set of runtime context features, for the user to choose to add into the program.

According to another aspect of the present invention, there is provided a system for code suggestion. The system comprises one or more processors and a memory coupled to at least one of the one or more processors. The system further comprises a set of computer program instructions stored in the memory and executed by at least one of the one or more processors in order to perform an action of collecting a set of runtime context features of a program that is being edited. The system further comprises a set of computer program instructions stored in the memory and executed by at least one of the one or more processors in order to perform an action of comparing the set of runtime context features with at least one set of stored context features to find at least one matching set of stored context features. Each of the at least one set of stored context features is extracted from a corresponding code segment. The system further comprises a set of computer program instructions stored in the memory and executed by at least one of the one or more processors in order to perform an action of presenting at least one code segment with its set of stored context features matching the set of runtime context features, for the user to choose to add into the program.

According to a further aspect of the present invention, there is provided a computer program product for code suggestion. The computer program product comprises a computer readable storage medium having program instructions embodied therewith. The program instructions being executable by a device to perform a method. The method comprises collecting a set of runtime context features of a program that is being edited. The method further comprises comparing the set of runtime context features with at least one set of stored context features to find at least one matching set of stored context features. Each of the at least one set of stored context features is extracted from a corresponding code segment. The method further comprises presenting at least one code segment with its set of stored context features matching the set of runtime context features, for the user to choose to add into the program.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
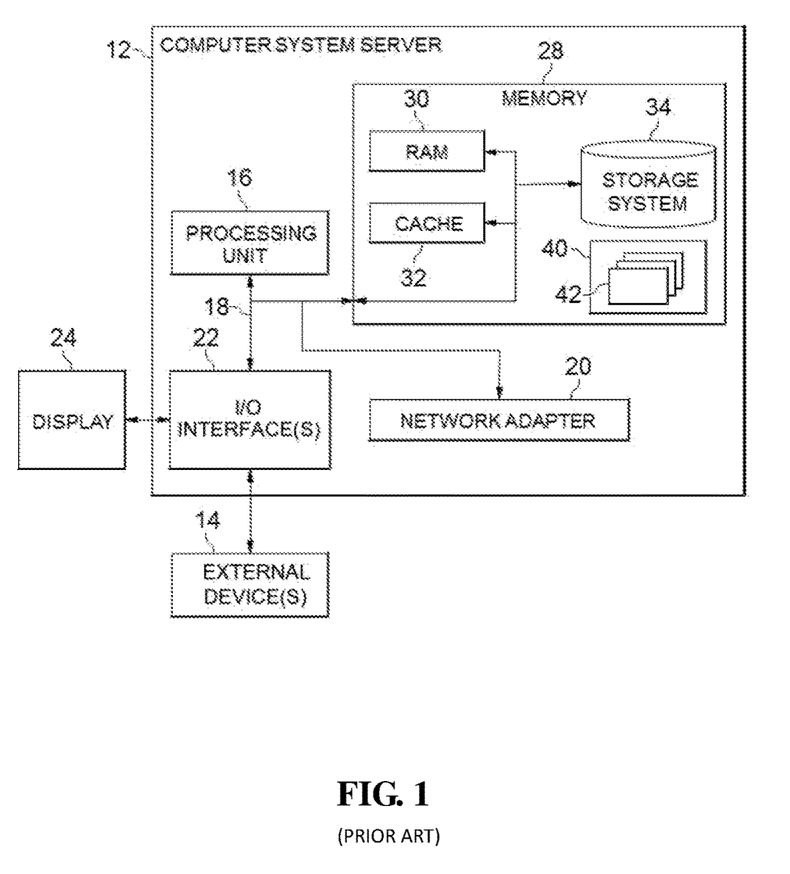
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be implemented in the computer system/server 12.

The inventors of the present invention found that, current code suggestion technologies mainly focus on auto-completing for keywords, names of methods and variables in a program. This kind of code suggestion is only based on previously defined variables and methods in the program. That is, the code suggestion in the prior art is based on static code analysis, which only analyzes static source code and provides very limited information.

Further, the inventors of the present invention found that, it would be useful if the IDE could provide code suggestions on the basis of code segments (snippets) that have specific functions, which would lower the requirement for the programmer to master a package or software development kit (SDK), to ease the programming work. The inventors of the present invention found that, in some specific fields, it is feasible to suggest code segments since processes (functions or methods) involved in a specific field are limited. For example, in the field of graphics, involved processes may include: draw a line, draw a rectangle, draw an oval, draw a polygon and etc. In the field of data analytics, involved processes may include at least the following categories: data import, data cleaning, data exploration, feature engineering and modeling. These processes are repetitive in analytics programs and can be organized in a better way.

The inventors of the present invention also found that, even if there is code suggestion for code segments, it is not flexible and agile enough if it is only based on static code analysis. To address this problem, the inventors of the present invention introduce dynamic code suggestion.

Figure 2:
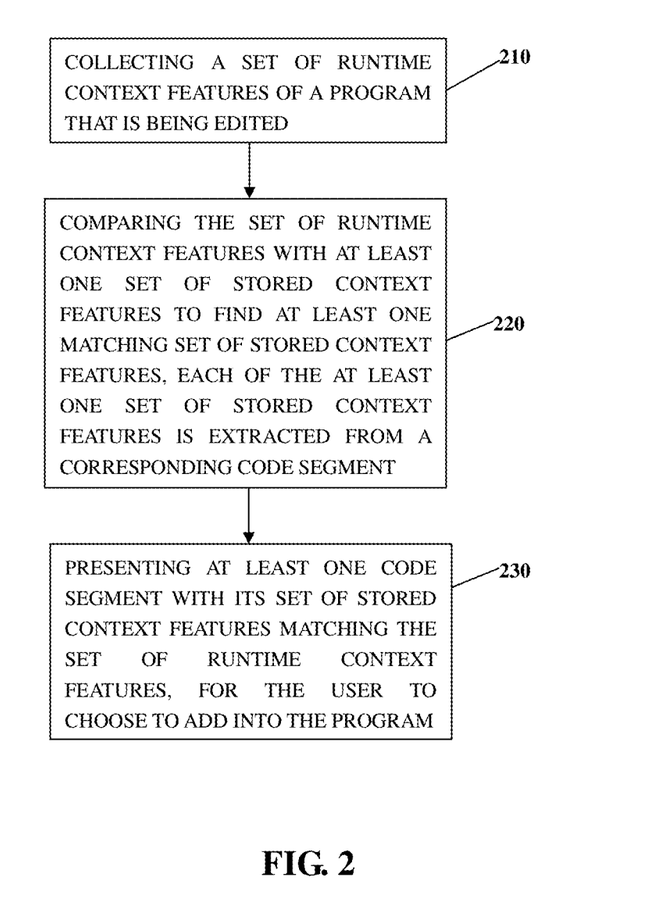
FIG. 2 is a flowchart illustrating a computer-implemented method for code suggestion according to an embodiment of the present invention.

With reference now to FIG. 2, FIG. 2 is a flowchart illustrating a computer-implemented method for code suggestion according to an embodiment of the present invention. As shown in FIG. 2, the computer-implemented method for code suggestion includes a runtime context feature collecting step 210, a comparing step 220, and a suggestion presenting step 230. The method in FIG. 2 will be performed when a programmer uses an editor to edit his/her program. Hereinafter, respective steps of the method for code suggestion in FIG. 2 will be explained in detail.

Specifically, in the runtime context feature collecting step 210, a set of runtime context features of a program that is being edited is collected. In one embodiment of the invention, the method in FIG. 2 is performed in response to at least one of the user opening an editor for editing the program, the user executing a code segment, the user inputting a keyword for searching and the user pressing a suggestion button. For example, opening of an editor for a data analytics program (e.g., Jupyter Notebook®), importing data by executing a segment of code, or inputting a keyword in a search field provided by the editor will trigger the collection for runtime context features. These triggers are only given as examples. Other events may also trigger the collection operation, such as the user pressing a suggestion button.

In one embodiment of the invention, the runtime context feature may be a feature collected at runtime and includes at least one of: programming language of the program, code comments in the program, input search keywords, imported packages, classes or functions in the program, data types and names of variables in the program, values of variables in the program, and value distribution of elements of a compound variable in the program. The programming language of a program can be obtained from the file name of the file being edited. For example, from a file named "abc.java", it can be determined that the programming language of the program is Java. Code comments refer to comments written by the programmer to help understand the function or logic of a program, a method, a code segment or a statement, and are not necessarily a part of the source code. Some IDEs may provide a search field for the programmer to input keywords (e.g., in a help document), and the search results will help the programmer in the aspect described by the input keywords. The keyword input by the programmer is one kind of runtime context feature. In one embodiment of the invention, the imported packages, classes or functions will be explicitly written in the source code; but in another embodiment of the invention, the imported packages, classes or functions depend on values of variables and can be determined only at runtime.

Normally, data types and names of variables can be collected from the source code as static information. However, in some dynamic languages such as Python, data type of a variable is not predefined, which is automatically determined based on the value assigned to this variable at runtime. Thus, when using a dynamic language such as Python, data type of a variable can be collected only at runtime. Additionally, as known, values of variables can be collected at runtime.

In the field of data analytics, the object to be analyzed is data, which is normally organized in a table of database or a data structure. In many programming languages (e.g., R language) or SDKs (such as Python pandas and Apache Spark®), a data structure such as DataFrame is used to accommodate structured or semi-structured data. That is, the compound variable of the invention may be a DataFrame variable having columns, and name and data type of each column can be determined only at runtime. For a DataFrame variable, it is like a table and may have stored many data records, each of which corresponds to an element of the variable. In one embodiment of the invention, features of DataFrame variables (e.g., the value distribution of a column in the DataFrame) also belong to runtime context feature and can be collected only at runtime.

Although several examples for runtime context feature are given above, it does not mean to be exhaustive. Those skilled in the art can think of other runtime context features based the teaching of the invention. The runtime context features to be collected are not fixed, and any combination of these runtime context features may be collected as the set of runtime context features.

Recently, interactive development environment such as Jupyter Notebook® becomes popular. The interactive development environment is characterized in that it has an interactive runtime and is used with a dynamic programming language. It means that the source code does not need to be complied as files, whenever a segment of code is input, this segment of code will be interpreted and executed immediately, and the result of execution will reflect in variables. That is why it is called "interactive". For example, if a code segment "a=1; c=a+2;" is input in an interactive development environment, this code segment will be interpreted and executed immediately, and variable c will instantly have a value of 3. This is different from a conventional development environment, in which source codes are compiled and executed as a file, and variable c will have a value only after compiling the whole source code file and executing it.

In one embodiment of the invention, for an interactive development environment, in the runtime context feature collecting step 210, the set of runtime context features can be collected directly from the interactive runtime. In another embodiment of the invention, for a non-interactive development environment in which the source code needs to be complied or interpreted, in the runtime context feature collecting step 210, the set of runtime context features can be collected by compilation execution or interpretation execution of the current source code.

The following embodiments of the present invention will be explained by way of examples of an interactive development environment, but the invention is not thus limited to the interactive development environment, and it is also applicable to those non-interactive development environments Likewise, the following embodiments of the present invention will be explained by way of an exemplary field of data analytics, but the invention is not thus limited to the specific field of data analytics, and it is also applicable to other fields such as graphics, and statistics.

In one embodiment of the invention, the collected set of runtime context features may be represented as pairs of key and value. For example, if the following codes in Python is input and executed, wherein df is a DataFrame variable.

df=SQL("SELECT Model, Number FROM Table_A ORDER BY Number DESC")

the interactive development environment will output the value of df in real time as

| Model | Number |
|-------|--------|
| XL    | 5000   |
| M     | 3000   |
| S     | 1900   |

Then, the user inputs the following codes:
Draw a pie chart of Model
import matplotlib as plt At this time, if the collecting of runtime context features is triggered by the execution of the subsequent input codes or by the user pressing a suggestion button for example, the collected set of runtime context features may be:

Programming language: {Python 2.7}
Imported packages/classes/functions: {matplotlib}
Variables at runtime context: {df:DataFrame}
Schema of runtime context variable: {df:{
DataType:DataFrame,
Columns: {
"Model": ("String", ['XL', 'M', 'S']),
"Number" ("numeric", [5000, 3000, 1900])}}}
Natural language: {"Draw a pie chart of Model"}

In the above example, the collected runtime context features are organized in written description that can be read by human. In other embodiments of the invention, the collected runtime context features can be organized in a self-defined data structure, in a XML file, in a plain text file or in other forms, as long as it can represent a correspondence between a feature and its value. The above written description shows the following context features of this example code segment: the programming language of this code segment is Python 2.7; a package named "matplotlib" is imported in this code segment; there is a variable df in this code segment and its data type is DataFrame; for the compound variable df, it has two columns "Model" and "Number", the column "Model" has a data type of "String" and values of "XL", "M" and "S", the column "Number" has a data type of "numeric" and values of 5000, 3000 and 1900; and natural language "Draw a pie chart of Model" is found from code comments and/or search keywords. The collected runtime context features in this example are used to describe the invention, and do not include all possible runtime context features. In other embodiments, other context features may be collected, or some context features in the above set may not be collected.

Now referring back to FIG. 2, in the comparing step 220, the set of runtime context features is compared with at least one set of stored context features to find at least one matching set of stored context features. Each of the at least one set of stored context features is extracted from a corresponding code segment. That is, there is a code segment library previously established, in which context features of each code segment is extracted and stored. This code segment library may be located in the local machine or in a remote server. These stored sets of context features are compared with the collected set of runtime context features of the program being edited, to pick one or more appropriate code segments as suggestion. These stored sets of context features have a similar or same structure compared to that of the collected set of runtime context features. For example, for each code segment in the library, a set of context features such as programming language, imported packages, variables, schema of runtime context variable and natural language (code comments or search keywords) are stored. In other embodiments, the stored set of context features may include different features.

In one embodiment of the invention, the at least one set of stored context features is previously extracted from at least one of code segments written by experts or the user himself, code segments in package documentation, and code segments on websites on the Internet. The code segment library is a library containing code segments that may be reused in programming. In one embodiment of the invention, these code segments may be the ones written in the IDE by the current user or other users in the past. In another embodiment of the invention, these code segments may be obtained from package documentation or tutorials. In another embodiment of the invention, these code segments may be obtained by crawler from Internet websites such as SDK documentation, stackoverflow.com, and gist.github.com.

After a code segment is obtained, its context features can be extracted manually or automatically. In one embodiment of the invention, an expert may tag extracted context features for some code segments so that these extracted context features are well-formed. In another embodiment of the invention, context features of a code segment programmed locally may be recorded when it is at runtime. After context features are extracted for a code segment, the code segment is stored in the library based on its context features.

Now referring back to FIG. 2, in the suggestion presenting step 230, at least one code segment with its set of stored context features matching the set of runtime context features is presented, for the user to choose to add into the program. In one embodiment of the invention, a list of top code segments having the most matching context features is presented to the user. In another embodiment of the invention, only one code segment that best matches the runtime context features is presented to the user. When being presented, the whole or a part of each matching code segment is presented to the user. Alternatively, only name, index or function of each matching code segment is presented to the user. The user may choose one code segment from the presented ones, and the chosen code segment will be added into the program at the current position of cursor.

Figure 3:
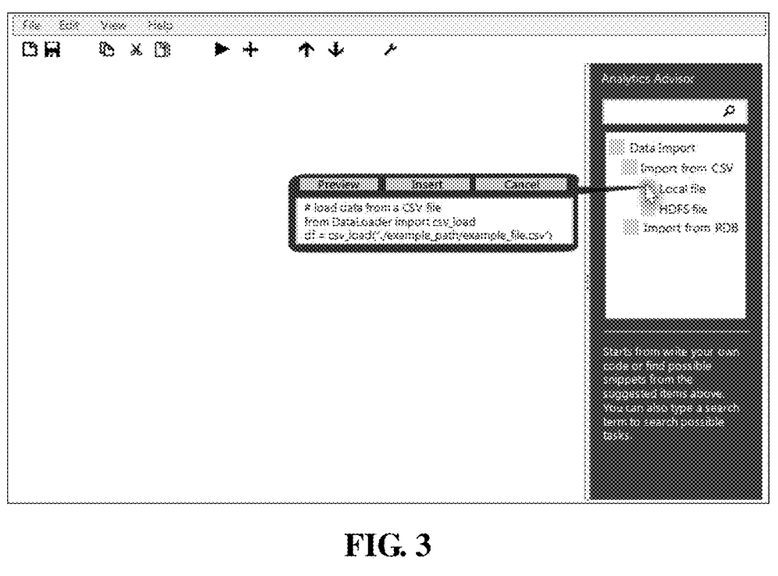
FIG. 3 shows an exemplary screen of an interactive development environment for data analytics in which a blank file is opened in its editor.

FIG. 3 shows an exemplary screen of an interactive development environment for data analytics in which a blank file is opened in its editor. In response to the opening of the editor, the method in FIG. 2 is triggered to be performed. At this time, for example, the following set of runtime context features can be collected, wherein { } represents an empty set:
Programming language: {Python 2.7}
Imported packages/classes/functions: { }
Variables at runtime context: { }
Schema of runtime context variable: { }
Natural language: { }

Considering that it is to write a program for data analytics in the interactive development environment designed for data analytics in FIG. 3, it can be determined that, data are necessary and prerequisite. Based on the collected set of runtime context features, code segments used for data import are matching code segments for this scenario. Therefore, in the panel with a title of "Analytics Advisor" on the right side of FIG. 3, various code segments for data import are suggested in names. For example, two ways of data import from CSV (Comma Separated Value) and one way of data import from RDB (Relational Database) are presented to the user. When the user moves the mouse pointer to "Local file", a code segment for data import from local file as a suggestion is displayed in a pop up window. If the user presses the "Insert" button, the displayed code segment will be added into the editor on the left side of FIG. 3.

Figure 4:
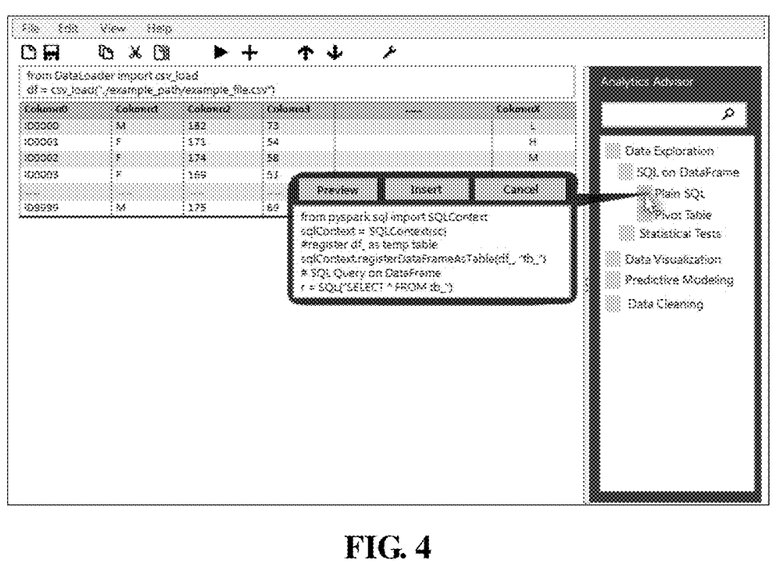
FIG. 4 shows an exemplary code suggestion according to one embodiment of the invention.

FIG. 4 shows an exemplary code suggestion according to one embodiment of the invention. In FIG. 4, the suggested code segment in FIG. 3 has been added into the editor in response the selection by the user. After that, the user has the added code segment executed by pressing "Enter" key for example. In response to the execution of the code segment for data import, a DataFrame df is imported and displayed as a table in FIG. 4. In response to the execution of the code segment for data import, the method in FIG. 2 is triggered to be performed again. At this time, for example, the following set of runtime context features can be collected (here the schema of DataFrame "df" is omitted as " . . . " since it has too many columns and values):
Programming language: Python 2.7
Imported packages/classes/functions: {DataLoader, csv_load}
Variables at runtime context: {df:DataFrame}
Schema of runtime context variable: {df:{ . . . }}
Natural language: { }

Considering that data has been imported and there are not any other inputs, it can be coarsely estimated that, next, data exploration such as descriptive analysis and correlation might be probably performed using SQL. Based on the collected set of runtime context features, code segments used for data exploration are matching code segments for this scenario. Therefore, in the panel on the right side of FIG. 4, various code segments for data exploration are suggested in names. For example, two ways of using SQL on DataFrame are presented to the user. When the user moves the mouse pointer to "Plain SQL", a code segment for introducing SQL as a suggestion is displayed in a pop up window. If the user presses the "Insert" button, the displayed code segment will be added into the editor of FIG. 4.

Figure 5:
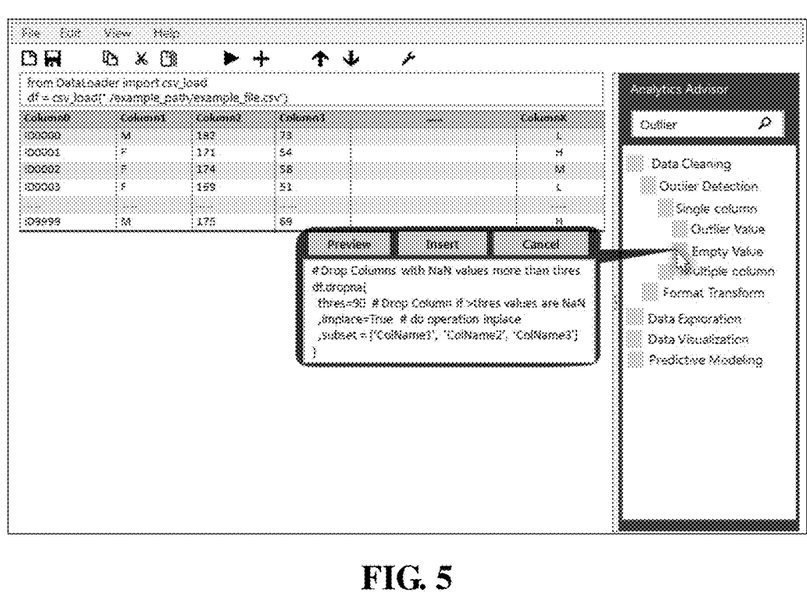
FIG. 5 shows another exemplary code suggestion according to one embodiment of the invention.

FIG. 5 shows another exemplary code suggestion according to one embodiment of the invention. Similar to the situation in FIG. 4, FIG. 5 shows an alternative code suggestion. Likewise, in FIG. 5 the suggested code segment in FIG. 3 has been added into the editor in response the selection by the user. After that, the user has the added code segment executed by pressing "Enter" key for example. In response to the execution of the code segment for data import, a DataFrame df is imported and displayed as a table in FIG. 5. In response to the execution of the code segment for data import, the method in FIG. 2 is triggered to be performed again. Being different from the situation in FIG. 4, at this time, the user input a keyword "Outlier" in the search field. Thus, for example, the following set of runtime context features can be collected (here the schema of DataFrame "df" is omitted as " . . . " too):

Programming language: Python 2.7
Imported packages/classes/functions: {DataLoader, csv_load}
Variables at runtime context: {df:DataFrame}
Schema of runtime context variable: {df:{ . . . }}
Natural language: {"Outlier"}

Considering that data has been imported and the user is searching the keyword "Outlier", it can be estimated that, next, processes relating to "Outlier" might be performed. Based on the collected set of runtime context features, for example, code segments used for outlier detection are matching code segments for this scenario. Therefore, in the panel on the right side of FIG. 5, one branch "Outlier Detection" in the root category "Data Cleaning" is expanded, and various code segments for outlier detection under this branch are suggested in names. For example, two ways of single column detection and one way of multiple detection are presented to the user. When the user moves the mouse pointer to "Empty Value", a code segment for empty value cleaning as a suggestion is displayed in a pop up window. If the user presses the "Insert" button, the displayed code segment will be added into the editor of FIG. 5.

In another embodiment of the invention, if there are not any inputs after the data import of DataFrame df is finished (like the situation in FIG. 4), code segments for a specific function other than introducing SQL might be suggested if the value distribution of DataFrame df have some characteristics. In an embodiment of the invention, if the format of data in df are not unified (for example, integers are mixed with floats), code segments for format transform may be suggested; in another embodiment of the invention, if empty values are too many in the df, code segments for empty value cleaning may be suggested; and in a further embodiment of the invention, if data in df relates to health care and shows young people (<18 years old for example) occupy a high ratio, code segments for youth health insurance query may be suggested. In these embodiments, code suggestions are provided not only on the code, but also on the value of data from runtime.

Figure 6:
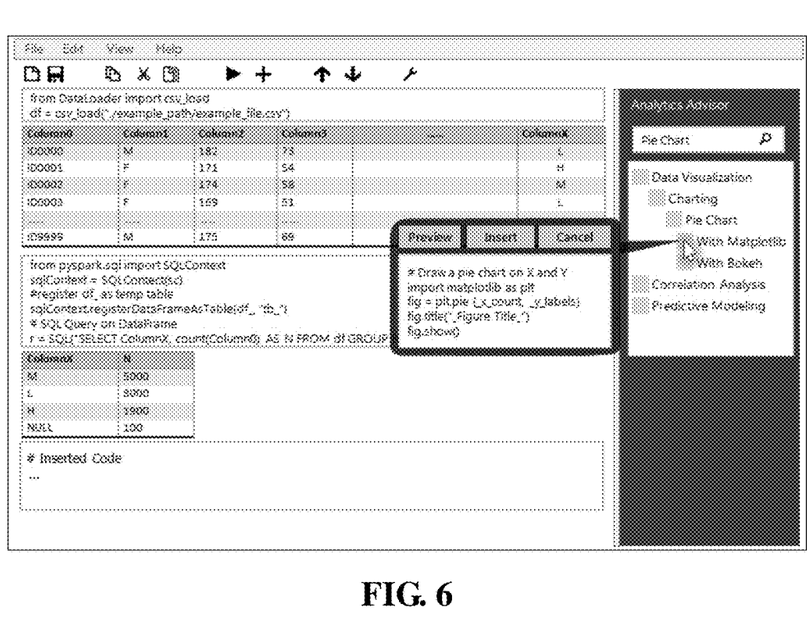
FIG. 6 shows an example in which different code suggestions are provided based on different collected sets of runtime context features according to one embodiment of the invention.
Figure 7:
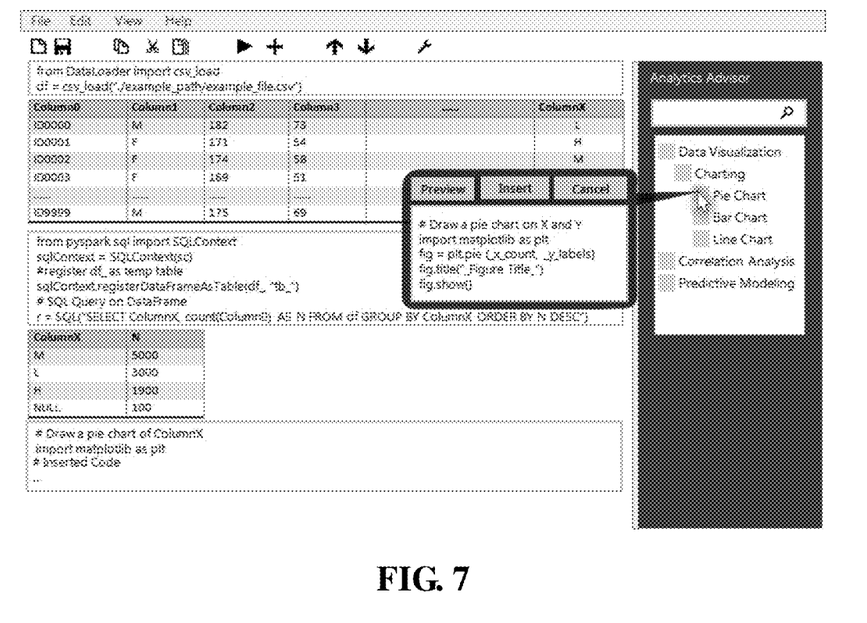
FIG. 7 shows an example in which different code suggestions are provided based on different collected sets of runtime context features according to one embodiment of the invention.

FIGS. 6 and 7 show an example in which different code suggestions are provided based on different collected sets of runtime context features according to one embodiment of the invention. In FIG. 4, when the user presses the "Insert" button, the suggested code segment for introducing SQL is added into the editor (see either of FIGS. 6 and 7). After that, the user has the newly added code segment executed by pressing "Enter" key for example. In response to the execution of the code segment for introducing SQL, a DataFrame r is returned as a query result. Data in Dataframe r is displayed in FIGS. 6 and 7. In response to the execution of the code segment for introducing SQL, the method in FIG. 2 is triggered to be performed again.

The situations in FIGS. 6 and 7 are the same till now. After that, different inputs are done in FIGS. 6 and 7. Specifically, in FIG. 6, the user inputs keywords "Pie Chart" in the search field. However, in FIG. 7, the user inputs a line of code "import matplotlib as plt" and a comment "Draw a pie chart of ColumnX", which makes two different runtime context features will be collected in FIGS. 6 and 7 (other collected runtime context features are the same):

Natural language: {"Pie Chart"} (only in the situation of FIG. 6)
Imported packages/classes/functions: {matplotlib} (only in the situation of FIG. 7)
Natural language: {"Draw a pie chart of ColumnX"} (only in the situation of FIG. 7)

Based on the above different collected runtime context features, for both of the situations, it can be predicted that it needs to draw a pie chart. Therefore, various code segments for drawing a pie chart may be suggested. For the situation in FIG. 6, for example, two code segments as suggestions are presented. One code segment is used to draw a pie chart with Matplotlib library, and the other code segment is used to draw a pie chart with Bokeh library. As shown in FIG. 6, names of two code segments "With Matplotlib" and "With Bokeh" under the branch "Pie Chart" are presented. However, for the situation in FIG. 7, considering the library "matplotlib" has been imported, it is not appropriate to suggest importing another similar library. Thus, only one code segment used for drawing a pie chart with Matplotlib library as suggestion is presented, which is a more accurate suggestion. As shown in FIG. 7, only a code segment named "Pie Chart" is presented.

In one embodiment of the invention, the comparing in the comparing step 220 can be performed based on some predefined rules. For example, some context features must be matched between the program being edited and the stored code segments, such as their program language. For other context features, the more matched features are found, the more appropriate the code segment is to be presented as a suggestion.

In another embodiment of the invention, the comparing step 220 may comprise for each context feature in the set of runtime context features, finding a corresponding context feature in a first set of the at least one set of stored context features to form a pair of corresponding context features. The comparing step 220 may further comprise calculating a similarity score for each pair of corresponding context features. The comparing step 220 may further comprise obtaining a final score for the first set of the at least one set of stored context features by summing up the calculated similarity scores with weights. The comparing step 220 may further comprise for other sets of the at least one set of stored context features, repeating the finding, the calculating and the obtaining to get their final scores. The comparing step 220 may further comprise determining at least one set of stored context features with top final scores as a set of stored context features that matches the set of runtime context features.

That is, in this embodiment, for each stored code segment, a score is calculated based on matching degree of its context features with respective runtime context features of the program being edited. Then, top code segments with the highest scores will be presented as suggestions. In one embodiment of the invention, the score may be a weighted sum $S=a*A+b*B+c*C+\ldots$ Here, A, B, C ... represent that, for different context features, whether it matches with the corresponding runtime context feature, and a, b, c ... are their respective weights.

In one embodiment of the invention, a popular value is assigned to each stored code segment, which reflects popularity (that is, frequency of being accepted as a suggestion) for this code segment. When a code segment is matched for suggestion in the comparing step 220, its popular value is considered as a factor for its listing position in the sequence for suggestion. For example, for matched code segments, the higher the popular value is, the closer the code segment is to the top.

In one embodiment of the invention, after presenting at least one code segment, if the user does not choose any code segment, subsequent input code of the user and context features of the input code will be stored for further code suggestion. In this case, the popular values of the presented code segments may be reduced.

Although in the above embodiments, suggested code segments are added into the program being edited. Actually, in most situations, a suggested code segment could not fit in exactly, which needs to be adapted for the program being edited, by amending some names of variables or functions for example. Even in this case, the invention will still accelerate the programming.

Although in FIGS. 3-7 code suggestions are presented in the form of expanded branch(es) of a tree structure, it can be presented in other forms. For example, in an embodiment of the invention, it can be presented in a list or a table.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a system for code suggestion. The system comprises one or more processors and a memory coupled to at least one of the one or more processors. The system further comprises a set of computer program instructions stored in the memory and executed by at least one of the one or more processors in order to perform an action of collecting a set of runtime context features of a program that is being edited. The system further comprises a set of computer program instructions stored in the memory and executed by at least one of the processors in order to perform an action of comparing the set of runtime context features with at least one set of stored context features to find at least one matching set of stored context features. Each of the at least one set of stored context features is extracted from a corresponding code segment. The system further comprises a set of computer program instructions stored in the memory and executed by at least one of the processors in order to perform an action of presenting at least one code segment with its set of stored context features matching the set of runtime context features, for the user to choose to add into the program.

In one embodiment of the system, wherein the set of computer program instructions is performed in response to at least one of the user opening an editor for editing the program, the user executing a code segment, the user inputting a keyword for searching, and the user pressing a suggestion button.

In one embodiment of the system, wherein the runtime context feature is a feature collected at runtime and includes at least one of: programming language of the program, code comments in the program, input search keywords, imported packages, classes or functions in the program, data types and names of variables in the program, values of variables in the program, and value distribution of elements of a compound variable in the program.

In one embodiment of the system, wherein the at least one set of stored context features is previously extracted from at least one of code segments written by experts or the user himself, code segments in package documentation, and code segments on websites on the Internet.

In one embodiment of the system, wherein comparing the set of runtime context features with at least one set of stored context features to find at least one matching set of stored context features further comprises: for each context feature in the set of runtime context features, finding a corresponding context feature in a first set of the at least one set of stored context features to form a pair of corresponding context features; calculating a similarity score for each pair of corresponding context features; obtaining a final score for the first set of the at least one set of stored context features by summing up the calculated similarity scores with weights; for other sets of the at least one set of stored context features, repeating the finding, the calculating and the obtaining to get their final scores; and determining at least one set of stored context features with top final scores as a set of stored context features that matches the set of runtime context features.

In one embodiment of the system, wherein after presenting at least one code segment, if the user does not choose any code segment, subsequent input code of the user and context features of the input code will be stored for further code suggestion.

In one embodiment of the system, wherein the compound variable is a DataFrame variable having columns, and name and data type of each column can be determined only at runtime.

In an embodiment of the present invention, there is provided a computer program product for code suggestion. The computer program product comprises a computer readable storage medium having program instructions embodied therewith. The program instructions being executable by a device to perform a method. The method comprises collecting a set of runtime context features of a program that is being edited. The method further comprises comparing the set of runtime context features with at least one set of stored context features to find at least one matching set of stored context features. Each of the at least one set of stored context features is extracted from a corresponding code segment. The method further comprises presenting at least one code segment with its set of stored context features matching the set of runtime context features, for the user to choose to add into the program.

In one embodiment of the computer program product, wherein the method is performed in response to at least one of the user opening an editor for editing the program, the user executing a code segment, the user inputting a keyword for searching, and the user pressing a suggestion button.

In one embodiment of the computer program product, wherein the runtime context feature is a feature collected at runtime and includes at least one of: programming language of the program, code comments in the program, input search keywords, imported packages, classes or functions in the program, data types and names of variables in the program, values of variables in the program, and value distribution of elements of a compound variable in the program.

In one embodiment of the computer program product, wherein the at least one set of stored context features is previously extracted from at least one of code segments written by experts or the user himself, code segments in package documentation, and code segments on websites on the Internet.

In one embodiment of the computer program product, wherein comparing the set of runtime context features with at least one set of stored context features to find at least one matching set of stored context features further comprises: for each context feature in the set of runtime context features, finding a corresponding context feature in a first set of the at least one set of stored context features to form a pair of corresponding context features; calculating a similarity score for each pair of corresponding context features; obtaining a final score for the first set of the at least one set of stored context features by summing up the calculated similarity scores with weights; for other sets of the at least one set of stored context features, repeating the finding, the calculating and the obtaining to get their final scores; and determining at least one set of stored context features with top final scores as a set of stored context features that matches the set of runtime context features.

In one embodiment of the computer program product, wherein after presenting at least one code segment, if the user does not choose any code segment, subsequent input code of the user and context features of the input code will be stored for further code suggestion.

In one embodiment of the computer program product, wherein the compound variable is a DataFrame variable having columns, and name and data type of each column can be determined only at runtime.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for code suggestion, the method comprising:
    collecting, using a processor, a set of runtime context features of a program that is being edited, wherein each runtime context feature is a feature collected at runtime, wherein the set of runtime context features includes a programming language of the program, code comments in the program, input search keywords, imported packages, classes or functions in the program, data types and names of variables in the program, values of variables in the program, and value distribution of elements of a compound variable in the program;
    comparing, using the processor, the set of runtime context features with at least one set of stored context features to find at least one matching set of stored context features, each of the at least one set of stored context features is extracted from a corresponding code segment;
    presenting, using the processor, at least one name describing a respective first code segment with its set of stored context features matching the set of runtime context features, for the user to choose to add into the program, wherein the first code segment is hidden from the user;
    determining, using the processor, that the user has chosen the at least one name to preview the first code segment;
    in response to determining that the user has chosen the at least one name, causing the hidden first code segment to become visible to the user;
    determining, using the processor, that the user has chosen to add the first code segment into the program; and
    adding, using the processor, the first code segment into the program in response to the user choosing to add the first code segment into the program, and storing an input code from the user and context features associated with the input code in response to the user not choosing to add the at least one code segment into the program;
    detecting, using the processor, data has been imported to the program in response to the user choosing to add the first code segment to the program;
    presenting, using the processor, at least one name describing a second code segment used for data exploration based on detecting the imported data;
    wherein comparing the set of runtime context features with at least one set of stored context features to find at least one matching set of stored context features further comprises:
    for each context feature in the set of runtime context features, finding, using the processor, a corresponding context feature in a first set of the at least one set of stored context features to form a pair of corresponding context features;
    calculating, using the processor, a similarity score for each pair of corresponding context features;
    obtaining, using the processor, a final score for the first set of the at least one set of stored context features by calculating a weighted sum, the weighted sum being a sum of each calculated similarity score multiplied by a respective weight;
    for other sets of the at least one set of stored context features, repeating the finding, the calculating and the obtaining to get their final scores; and
    determining, using the processor, at least one set of stored context features with top final scores as a set of stored context features that matches the set of runtime context features.

2. The computer-implemented method according to claim 1, wherein the method is performed in response to at least one of the user opening an editor for editing the program, the user executing a code segment, the user inputting a keyword for searching, and the user pressing a suggestion button.

3. The computer-implemented method according to claim 1, wherein the at least one set of stored context features is previously extracted from at least one of first code segments written by experts or the user himself, first code segments in package documentation, and first code segments on websites on the Internet.

4. The computer-implemented method according to claim 1, wherein after presenting the at least one name describing the respective first code segment, if the user does not choose any first code segment, subsequent input code by the user and context features of the input code will be stored for further code suggestion.

5. The computer-implemented method according to claim 1, wherein the compound variable is a DataFrame variable having columns, and name and data type of each column can be determined only at runtime.

6. The computer-implemented method of claim 1 further comprising:
    determining, using the processor, that the user has not chosen to add a third code segment into the program; and
    storing, using the processor, an input code from the user and context features associated with the input code in response to the user not choosing to add the third code segment into the program.

7. A system for code suggestion, comprising:
one or more processors;
a memory coupled to at least one of the one or more processors;
a set of computer program instructions stored in the memory and executed by at least one of the one or more processors in order to perform actions of:
collecting a set of runtime context features of a program that is being edited, wherein each runtime context feature is a feature collected at runtime, wherein the set of runtime context features includes a programming language of the program, code comments in the program, input search keywords, imported packages, classes or functions in the program, data types and names of variables in the program, values of variables in the program, and value distribution of elements of a compound variable in the program;
comparing the set of runtime context features with at least one set of stored context features to find at least one matching set of stored context features, each of the at least one set of stored context features is extracted from a corresponding code segment;
presenting at least one name describing a respective code segment with its set of stored context features matching the set of runtime context features, for the user to choose to add into the program, wherein the code segment is hidden from the user;
determining, using the processor, that the user has chosen the at least one name to preview the code segment;
in response to determining that the user has chosen the at least one name, causing the hidden code segment to become visible to the user;
determining, using the processor, that the user has chosen to add the first code segment into the program; and
adding, using the processor, the first code segment into the program in response to the user choosing to add the code segment into the program, and storing an input code from the user and context features associated with the input code in response to the user not choosing to add the code segment into the program;
detecting, using the processor, data has been imported to the program in response to the user choosing to add the first code segment to the program;
presenting, using the processor, at least one name describing a second code segment used for data exploration based on detecting the imported data;
wherein comparing the set of runtime context features with at least one set of stored context features to find at least one matching set of stored context features further comprises:
for each context feature in the set of runtime context features, finding a corresponding context feature in a first set of the at least one set of stored context features to form a pair of corresponding context features;
calculating a similarity score for each pair of corresponding context features;
obtaining a final score for the first set of the at least one set of stored context features by calculating a weighted sum, the weighted sum being a sum of each calculated similarity score multiplied by a respective weight;
for other sets of the at least one set of stored context features, repeating the finding, the calculating and the obtaining to get their final scores; and
determining at least one set of stored context features with top final scores as a set of stored context features that matches the set of runtime context features.

8. The system according to claim 7, wherein the set of computer program instructions is executed in response to at least one of the user opening an editor for editing the program, the user executing a code segment, the user inputting a keyword for searching, and the user pressing a suggestion button.

9. The system according to claim 7, wherein the at least one set of stored context features is previously extracted from at least one of code segments written by experts or the user himself, code segments in package documentation, and code segments on websites on the Internet.

10. The system according to claim 7, wherein after presenting the at least one name describing the code segment, if the user does not choose any code segment, subsequent input code by the user and context features of the input code will be stored for further code suggestion.

11. The system according to claim 7, wherein the compound variable is a DataFrame variable having columns, and name and data type of each column can be determined only at runtime.

12. The system of claim 7, wherein the processor is further configured to:
determine that the user has not chosen to add a third code segment into the program; and
store an input code from the user and context features associated with the input code in response to the user not choosing to add the third code segment into the program.

13. A computer program product for code suggestion, the computer program product comprising a computer readable storage medium having program instructions embodied therewith, wherein the program instructions being executable by a processor to perform a method comprising:
collecting, using the processor, a set of runtime context features of a program that is being edited, wherein each runtime context feature is a feature collected at runtime, wherein the set of runtime context features includes a programming language of the program, code comments in the program, input search keywords, imported packages, classes or functions in the program, data types and names of variables in the program, values of variables in the program, and value distribution of elements of a compound variable in the program;
comparing, using the processor, the set of runtime context features with at least one set of stored context features to find at least one matching set of stored context features, each of the at least one set of stored context features is extracted from a corresponding code segment;
presenting, using the processor, at least one name describing a respective code segment with its set of stored context features matching the set of runtime context features, for the user to choose to add into the program, wherein the code segment is hidden from the user;
determining, using the processor, that the user has chosen the at least one name to preview the code segment;
in response to determining that the user has chosen that at least one name, causing, using the processor, the hidden code segment to become visible to the user;
determining, using the processor, that the user has or has not chosen to add the code segment into the program; and
adding, using the processor, the code segment into the program in response to the user choosing to add the code segment into the program, and storing an input code from the user and context features associated with the input code in response to the user not choosing to add the code segment into the program;

detecting, using the processor, data has been imported to the program in response to the user choosing to add the first code segment to the program;

presenting, using the processor, at least one name describing a second code segment used for data exploration based on detecting the imported data;

wherein comparing the set of runtime context features with at least one set of stored context features to find at least one matching set of stored context features further comprises:

for each context feature in the set of runtime context features, finding a corresponding context feature in a first set of the at least one set of stored context features to form a pair of corresponding context features;

calculating a similarity score for each pair of corresponding context features;

obtaining a final score for the first set of the at least one set of stored context features by calculating a weighted sum, the weighted sum being a sum of each calculated similarity score multiplied by a respective weight;

for other sets of the at least one set of stored context features, repeating the finding, the calculating and the obtaining to get their final scores; and determining at least one set of stored context features with top final scores as a set of stored context features that matches the set of runtime context features.

14. The computer program product according to claim 13, wherein the method is performed in response to at least one of the user opening an editor for editing the program, the user executing a code segment, the user inputting a keyword for searching, and the user pressing a suggestion button.

15. The computer program product according to claim 13, wherein the at least one set of stored context features is previously extracted from at least one of code segments written by experts or the user himself, code segments in package documentation, and code segments on websites on the Internet.

16. The computer program product according to claim 13, wherein after presenting the at least one name describing the respective code segment, if the user does not choose any code segment, subsequent input code by the user and context features of the input code will be stored for further code suggestion.

17. The computer program product of claim 13, wherein the processor is further configured to:

determine that the user has not chosen to add a third code segment into the program; and store an input code from the user and context features associated with the input code in response to the user not choosing to add the third code segment into the program.

* * * * *